United States Patent [19]

McIntire et al.

[11] Patent Number: 4,464,936

[45] Date of Patent: Aug. 14, 1984

[54] MONITORING APPARATUS FOR PRESSURE SENSITIVE DEVICES

[75] Inventors: Ronald A. McIntire, Blue Springs; Gary C. Batz, Kansas City, both of Mo.

[73] Assignee: Fike Metal Products Corporation, Blue Springs, Mo.

[21] Appl. No.: 404,852

[22] Filed: Aug. 3, 1982

[51] Int. Cl.³ ............................................. G01L 7/08
[52] U.S. Cl. .................................... 73/705; 250/231 P
[58] Field of Search ................. 73/705; 340/626, 611, 340/614, 619; 250/231 P, 231 R

[56] References Cited

U.S. PATENT DOCUMENTS 3,100,997  8/1963  Lorenz .................................. 73/705
3,215,135 11/1965  Franke ................................. 73/705
3,686,958  8/1972  Porter et al. ........................ 73/705
4,408,194 10/1983  Thompson ......................... 340/626

*Primary Examiner*—Donald O. Woodiel
*Attorney, Agent, or Firm*—Schmidt, Johnson, Hovey & Williams

[57] ABSTRACT

A monitoring apparatus for pressure sensitive devices is provided which detects the operating state of the monitored device, and which is designed to provide a reliable output even when operated in hostile, corrosive environments. The monitoring apparatus preferably includes a light source for transmitting a beam of light along a path of travel proximal to the monitored device, a light detector for detecting the light beam, and a member for adjusting the path of travel of the light beam in response to the actuation of the pressure sensitive device. Several alternative embodiments are disclosed.

13 Claims, 11 Drawing Figures

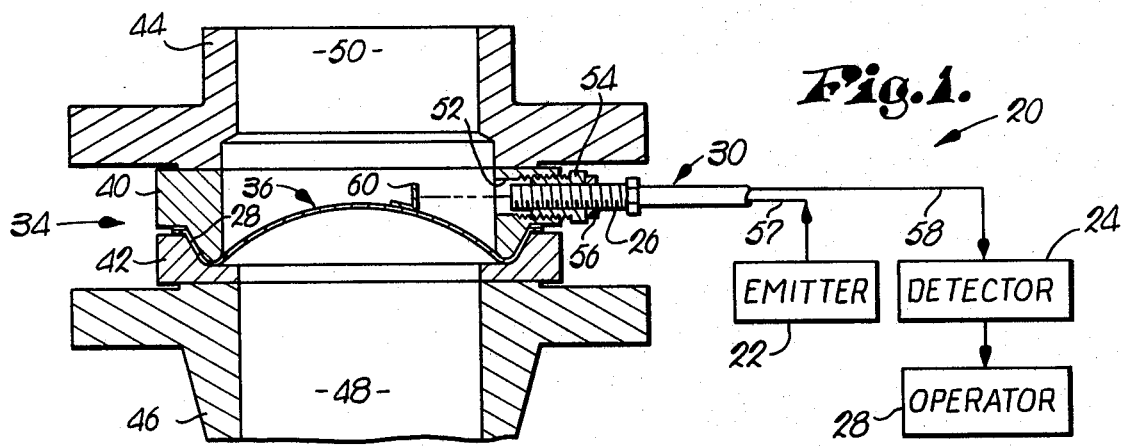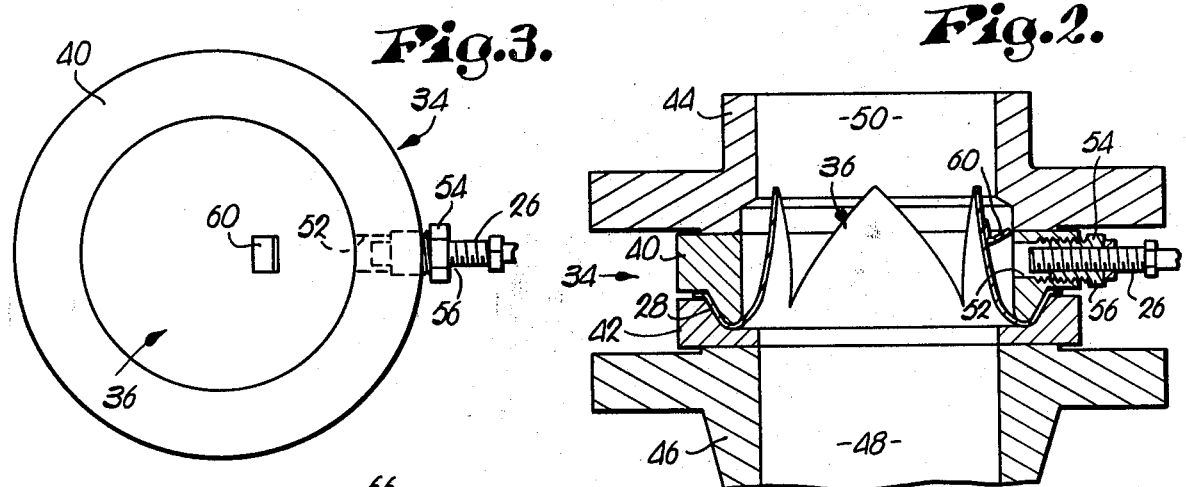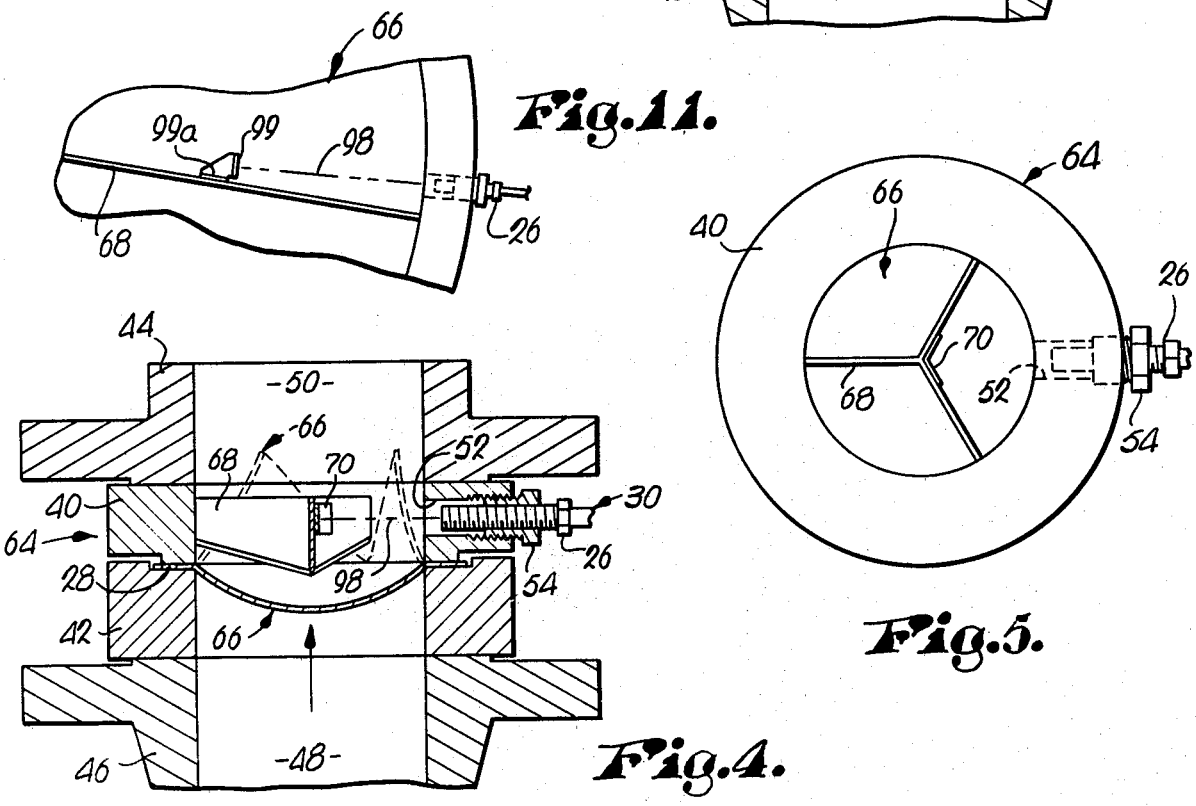

MONITORING APPARATUS FOR PRESSURE SENSITIVE DEVICES

TECHNICAL FIELD

This invention relates to monitoring devices, and more particularly, to unique means for monitoring the status of pressure sensitive devices.

BACKGROUND ART

Pressure sensitive devices such as rupture discs and rupture panels have in the past been fitted with monitoring devices to indicate when the disc or panel has ruptured. These devices have typically included electrical switches which are mechanically tripped by the rupturing of the disc or panel. Mechanically tripped electrical switches have proven unsatisfactory under conditions of extreme heat, and when used in volatile or corrosive environments. Insulation and solder joints, for instance, of mechanically operated electrical switches may melt when subjected to temperatures higher than 700° F. The materials in a mechanical switch are subject to deterioration when surrounded by corrosive fluids, and the use of electrically dependent switches often produces sparking between the leads of the switch, which could detonate an explosion when used near highly volatile fluids.

A monitoring apparatus for pressure sensitive devices is needed that is reliable and safe to use under conditions of high temperature, and in corrosive or volatile environments.

SUMMARY OF THE PRESENT INVENTION

The problems referred to above are in large measure solved by the monitoring apparatus for pressure sensitive devices in accordance with the present invention. That is to say, the present invention provides safe and reliable monitoring of the operational status of pressure sensitive devices under conditions of extreme heat, and in corrosive and volatile environments.

The monitoring apparatus hereof broadly includes a light source for generating a light beam, a light detector for detecting the light beam when the beam is aligned along a path of travel between the light source and the detector, and means for shifing the light beam relative to the path of travel between the light source and detector in response to differing operating conditions of the pressure sensitive device.

BRIEF DESCRIPTION OF THE DRAWINGS

FIG. 1 is a sectional view of a pressure sensitive rupture disc assembly with a monitoring device in accordance with the present invention installed therein;

FIG. 2 is similar to FIG. 1 but shows the rupture disc in its ruptured condition;

FIG. 3 is a plan view of a rupture disc showing the reflector and viewing piece of the monitoring device;

FIG. 4 is a sectional view of a reverse buckling rupture disc assembly depicted in conjunction with a second embodiment of the present invention, phantom lines depicting the disc in its ruptured position;

FIG. 5 is a plan view of the rupture disc and cutting knife of a reverse buckling rupture disc assembly depicted in conjunction with the second embodiment of the present invention;

FIG. 11 is an enlarged, fragmentary plan view of a reverse buckling rupture disc assembly in connection with a form of the invention which is slightly modified from that of FIGS. 4 and 5.

DETAILED DESCRIPTION

Figure 6:
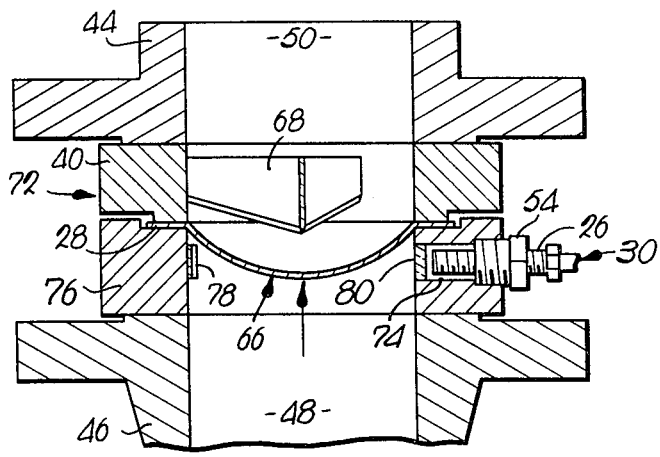
FIG. 6 is a sectional view of a reverse buckling rupture disc assembly depicted in conjunction with a third embodiment of the present invention.

Referring to the drawings, a monitoring apparatus 20 in accordance with the present invention broadly includes a conventional light emitter 22, light detector 24, and viewing piece 26, an operator assembly 28 comprising either an audio or visual alarm, and a fiber optic cable 30 interconnecting the emitter 22, detector 24, and viewing piece 26.

The pressure sensitive device depicted in FIGS. 1–3 comprises a rupture disc assembly 34 having a concavo-convex rupture disc 36. The rupture disc 36 is a thin metallic membrane of uniform thickness and includes an apron 28 interposed between retaining flange 40 and a base flange 42. The surface of the disc preferably has poor light reflecting characteristics. The flanges 40, 42 are fixedly interposed between upper and lower pipe sections 44, 46. The concave surface of disc 36, base flange 42, and lower pipe section 46 cooperatively define the upstream portion of a fluid tight chamber 48. The convex surface of the disc 36, retaining flange 40, and upper pipe section 44 define the lower portion of pressure release chamber 50.

The upper retaining ring 40 includes a bore 52, threaded at its outermost end. A threaded insert 54 is received within the bore 52. The viewing piece 26 is received within the insert 54 and is fixedly retained therein by suitable means such as a lock nut 56. The viewing piece 26 includes a conventional dual headed front piece; one head (not shown) for transmitting the light, and a second head (not shown) for receiving light. Fiber optic cable 30 includes two separate fiber optic channels schematically depicted at 57, 58. Channel 57 conveys light generated within the emitter 22 to the transmitting head of the viewing piece 26, and optic channel 58 conveys light from the receiving head of the viewing piece 26 to the detector 24. The emitter and detector may advantageously be of a type such as those sold by Dolan-Jenner Industries, Inc., under the trademarks LED PAK I, LED PAK II, or LED PAK IV.

A reflector 60 is fixedly attached to the rupture disc 36 and is positioned to reflect light from the transmit head to the receive head of the viewing piece 26 when the rupture disc 36 is in a normal, unruptured position. It will be noted that the bore 52 in the hold down flange 40 of the rupture disc assembly 32 has a diameter sufficiently larger than the diameter of the viewing piece 26 such that little or no light is reflected from the sides of the channel 58 to the receive head of the viewing piece 26, and all the reflected light received by the receive head is from the reflector 60.

The second embodiment of the present invention is depicted in FIGS. 4 and 5 in conjunction with a reverse buckling rupture disc assembly 64. The reverse buckling rupture disc 64 is similar in construction to the rupture disc 36 in most respects, and parts that find correspondence between the two rupture disc assemblies are marked with similar number. The reverse buckling rupture disc assembly 64 differs from the rupture disc assembly 32 in that the concavo-convex rupture disc 66 is positioned with its convex surface facing the chamber 48, and the disc assembly 64 includes a three-legged, cutting knife 68 disposed adjacent the concave surface of the disc 66. The second embodiment of the monitoring apparatus includes a reflector 70 fixedly mounted to two legs of the cutting knife 68.

The third embodiment of the present invention is depicted in FIG. 6 in conjunction with a reverse buckling rupture disc assembly 72. The rupture disc assembly 72 is similar to the reverse buckling rupture disc 66 in all respects except that the viewing piece 26 is located in a bore 74 in the base flange 76 of the assembly 72, and the reflector 78 is located on the sidewall of the base flange 76 opposite the viewing piece retaining bore 72. It will also be noted that the third embodiment includes a transparent cover 80 isolating the viewing piece 26 from the chamber 48.

Figure 7:
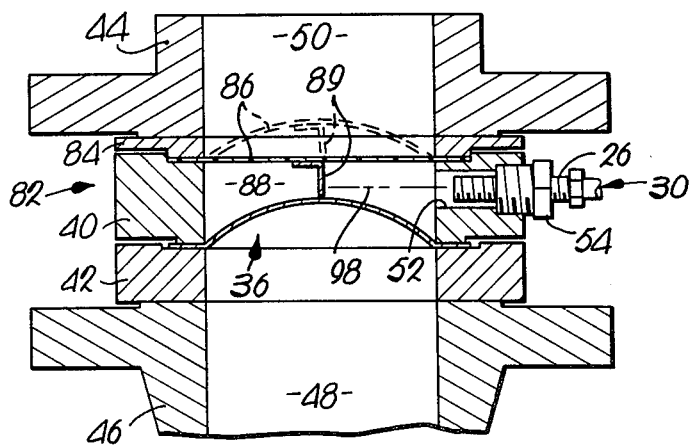
FIG. 7 is a sectional view of a rupture disc assembly depicted in conjunction with a fourth embodiment of the present invention, phantom lines depicting the flexible membrane in its extended configuration.

A fourth embodiment of the present invention configured as a pressure leak detector, is depicted in FIG. 7, in conjunction with a rupture disc assembly 82. Rupture disc assembly 82 includes a second, uppermost retaining flange 84. A flexible membrane 86, preferably of Teflon, is interposed in fluid tight relationship between the second retaining flange 84 and flange 40. The membrane 86 and rupture disc 36 cooperatively define a fluid tight chamber 88. Reflector 89 depends from membrane 86, extending into chamber 88. Under normal operating conditions the pressure within chamber 88 is approximately equal to the pressure within pressure release channel 50, and the membrane is maintained in a generally flat configuration. The membrane 86 is shiftable to an extended position wherein the membrane is maintained in a generally concavo-convex configuration, as depicted by the phantom lines in FIG. 7, when the pressure in chamber 88 exceeds the pressure in channel 50.

Figure 8:
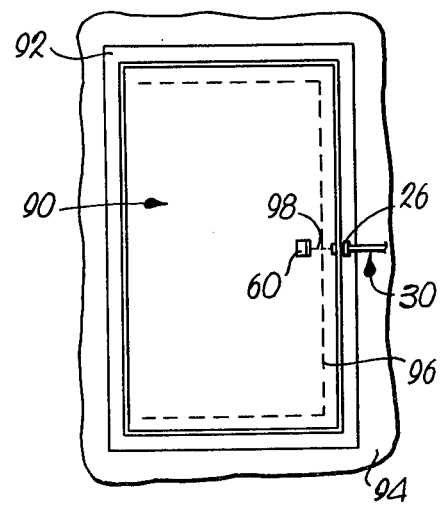
FIG. 8 is a pressure sensitive blow-out panel depicted in conjunction with the first embodiment of the present invention.

The first embodiment of the invention is depicted in conjunction with a blow-out panel 90 in FIG. 8. The blow-out panel includes a frame 92, which may be fitted in fluid tight relationship with the wall 94 of a pressurized container. The panel 90 includes a line of weakness 96 along which the panel 90 is designed to rupture. A reflector 60 is fixedly mounted on the panel 90, and a viewing piece 54 is mounted to the frame 92.

Figure 9:
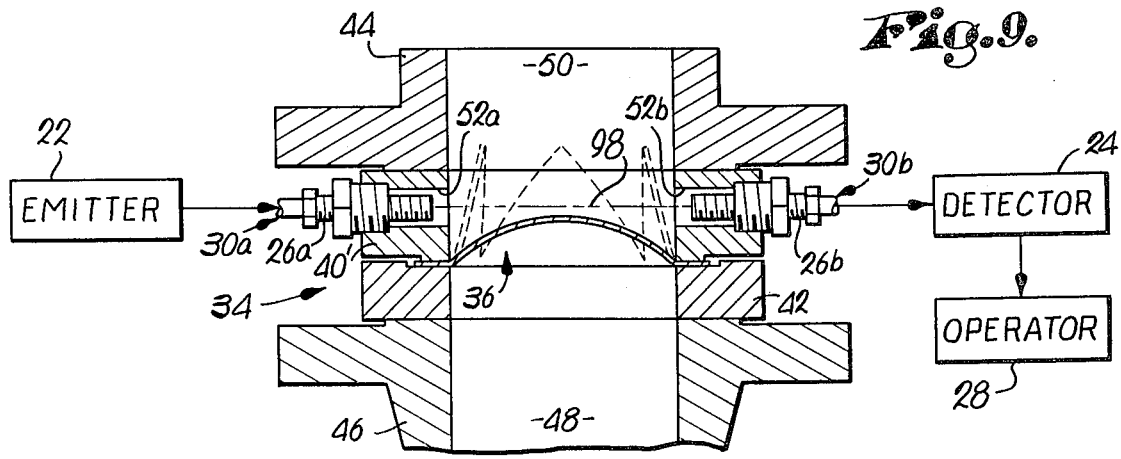
FIG. 9 is a sectional view of a rupture disc assembly depicted in conjunction with a fifth embodiment of the present invention.

A fifth embodiment of the present invention is depicted in conjunction with a rupture disc assembly 34 in FIG. 9. The monitoring apparatus in accordance with the fifth embodiment includes two viewing pieces 26a, 26b mounted in bores 52a, 52b of retaining flange 40. Viewing piece 26a includes a single viewing head (not shown) for transmitting light, and viewing piece 26b includes a single viewing head (not shown) for receiving light. Viewing piece 26a is connected to emitter 22 by fiber optic channel 30a, and viewing piece 26b is connected to detector 24 by fiber optic cable 30b.

Figure 10:
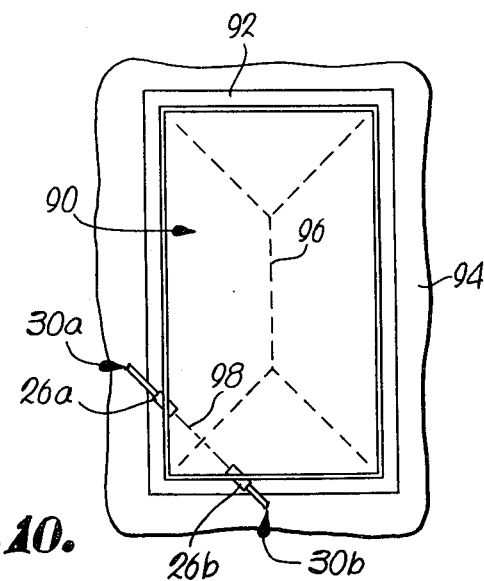
FIG. 10 is a blow-out panel depicted in conjunction with the fifth embodiment of the present invention mounted thereon.

The fifth embodiment of the invention is depicted in conjunction with a blow-out panel 90 in FIG. 10. Viewing pieces 26a, 26b are mounted on frame 92 of panel 90.

FIG. 11 shows an arrangement similar to that of FIGS. 4 and 5 with the exception that the FIG. 11 construction is especially suited for large diameter rupture disc assemblies. In this connection, it will be appreciated that the sensitivity of the emitter and detector may decrease as the length of the path of travel of the light beam increases. Accordingly, the arrangement in FIG. 11 locates the viewing piece 26 closely adjacent one blade of the knife 68 such that the path of travel 98 of the light beam closely parallels the plane of the knife blade. And, instead of mounting the reflector in this construction at the intersection of the knife blades as in FIG. 5, the reflector 99 is directly attached to the blade of the knife 68 most nearly paralleling the light beam 98 and in fairly close proximity to the viewing piece 26, all in accordance with the sensitivity of the viewing piece 26 as aforesaid.

The reflector 99 projects out from the side of the knife into a position directly above the rupture disc 66 and has a line of weakness 99a, represented by a fold line incurred during fabrication, which lies substantially parallel with the proximal blade of the knife 68. In such position and as so arranged, the reflector 99 is therefore vulnerable to impacting engagement by petals of the rupture disc 66 when the latter ruptures after engagement with the knife 68 during excessive pressure conditions. This action causes the reflector 99 to fold up about the line of weakness 99a and thereby move out of the path of travel 98 of the light beam from the viewing piece 26.

In operation, the emitter 22 produces a low level of light energy that is transmitted to the viewing piece 26 via channel 57 of fiber optic cable 30. The light produced by emitter 22 is preferably in the infrared range, particulary if the fluid in chamber 48 or channel 50 is not transparent. The beam of light transmitted from the viewing piece 26 is detected by the receive head of the viewing piece 26, when the beam is aligned along the predetermined path of travel indicated in each of the drawings by the dashed line 98. Light received at the receive head of viewing piece 26 is transmitted to the detector 24 via channel 58 of fiber optic cable 30. Detector 24 can be designed to provide an output signal to the operator 28 either in the presence or absence of a detection of a light signal. The operator assembly 28 will indicate by visual or audio means the presence of an output from the detector 24.

It will be appreciated from the drawings that the rupture disc depicted in the various rupture disc assemblies may be in either a normal, pressure containing position, or a ruptured, pressure releasing position. In the embodiment depicted in FIGS. 1–3, the reflector 60 is fixedly attached to the rupture disc 36 such that the light beam transmitted by viewing piece 26 follows the path of travel 98 when the rupture disc 36 is in its normal position. Rupture disc 36 will assume its ruptured position when the pressure differential between chamber 48 and pressure release channel 50 is greater than the rupture pressure of the disc 36. As depicted in FIG. 2, the reflector 60 is shifted when the disc 36 ruptures, and is no longer in a position to direct the light beam along path of travel 98. Although light is still transmitted from the transmit head of viewing piece 26, the relatively non-reflective surface of the rupture disc 36 is incapable of directing significant quantities of light energy back towards the receive head of the viewing piece 26. Detector 24 detects the absence of light at the receive head of viewing piece 26, and provides an indicating output to the operator 28.

Referring to FIGS. 4 and 5, it will be apparent that the light transmitted by viewing piece 26 in the second embodiment will be aligned along path of travel 98 when rupture disc 66 is in its normal position. When disc 66 buckles toward a reversed configuration against knife 68 due to excessive pressure in chamber 48, it ruptures. With disc 66 in its ruptured, pressure releasing position, as depicted by phantom lines in FIG. 4, the path of travel 98 of the light beam is interrupted by the non-reflective surface of rupture disc 66.

Referring to FIG. 6, it will be appreciated that light transmitted by the viewing piece 26 in the third embodiment will not be reflected back to the viewing piece 26 when the rupture disc 66 is in its normal position. Once the disc 66 ruptures against the sharp knife 68, however, the path of travel between viewing piece 26 and reflector 78 will no longer be obstructed, light will be reflected back to the viewing piece 26, and the detector and operator assemblies will indicate that the rupture disc is in its ruptured position.

Referring to FIG. 7, it will be appreciated that light transmitted from viewing piece 26 will be reflected back to the viewing piece along path of travel 98 when the membrane 86 is in its normal, generally flat configuration. If the rupture disc 36 develops a leak, the pressure in chamber 88 will equalize to the pressure level in chamber 48. The increase of pressure in chamber 88 will cause the membrane 86 to assume its extended, concavo-convex configuration depicted by the phantom lines in FIG. 7. Reflector 89 will be lifted upwardly away from the path of travel 98 when the membrane 86 assumes its extended position, and light transmitted by the viewing piece 26 will not be reflected back to the viewing piece 26. The detector will sense the loss of light at the receive head of the viewing piece when the reflector 89 is lifted out of its normal position, and the operator assembly will indicate the loss of fluid tight integrity within the rupture disc assembly.

Referring to FIG. 9, it will be seen that a beam of light transmitted by viewing piece 26a will be transmitted along path of travel 98 to the viewing piece 26b when the rupture disc is in its normal position. When the rupture disc 36 assumes its ruptured position, indicated in FIG. 9 by phantom lines, the path of travel 98 between viewing piece 26a and 26b will be interrupted. The detector 24 will produce an output when light is not received at viewing piece 26b, and the operator assembly 28 will accordingly indicate that the rupture disc 36 is in its ruptured position.

Referring to FIGS. 8 and 10, it will be appreciated that blow-out panels 90 will rupture along lines of weakness 96 when pressure within the container 94 exceeds the rupture rating of the panels. In the embodiment of FIG. 8, rupture of the panel 90 will shift the reflector 60 out of alignment with viewing piece 26.

In the embodiment of FIG. 10, rupture of panel 90 outwardly along lines of weakness 96 will cause the panel 90 to interrupt the path of travel 98 between viewing pieces 26a and 26b. The loss of light at viewing piece 26b will be detected by the detector 24, and an output signal will be delivered to the operator assembly 28 indicating that the panel is in its ruptured position.

As described above in connection with the construction of FIG. 11, the reflector 99 is mounted on the stationary knife 68 in a position of vulnerability with respect to the rupture disc 66. When the latter reverses its concavo-convex configuration so as to flex upwardly against the knife 68 and rupture, a petal of the ruptured disc 66 will strike the overhanging reflector 99 and cause it to bend upwardly about the line of weakness 99a. Accordingly, the light beam 98 is interrupted and a signal is generated in the regular manner.

We claim:

1. In combination with a pressure sensitive device having a pressure actuatable shiftable member which undergoes rupture when shifted from a normal position to an actuated position, monitoring apparatus for sensing the operational status of said device comprising:

means for transmitting a light beam, said transmitting means being oriented relative to said shiftable member such that said light beam is selectively shiftable between a plurality of paths of travel in response to shifting of said shiftable member from the normal position thereof toward an actuated position of the same, said transmitting means including a reflective element for directing said light beam along said one path of travel;

means for detecting said light beam when said light beam is aligned along a predetermined one of said paths of travel; and means responsive to said detecting means for indicating when said light beam is aligned along said one path.

2. Monitoring apparatus as claimed in claim 1, said reflective member being operably coupled to said shiftable member for direction of said light beam along said one path of travel when said shiftable member is in said normal position.

3. Monitoring apparatus as claimed in claim 1, said shiftable member blocking said one path of travel when in said normal position, and clearing said one path of travel when in said actuated position.

4. Monitoring apparatus as in claim 1, said member comprising a rupturable panel.

5. Monitoring apparatus as claimed in claim 1, said panel comprising a disc.

6. Monitoring apparatus as claimed in claim 2 or 3, said device comprising a reverse buckling, concavo-convex rupture disc assembly having a rupture disc and disc-cutting knife means.

7. Monitoring apparatus as claimed in claim 1, said device comprising a reverse buckling rupture disc assembly having a rupture disc and disc-cutting knife means said reflective member being operably coupled to said knife means.

8. Monitoring apparatus as claimed in claim 7, said reflective member being positioned on said knife means for shifting engagement out of said path of travel of the light beam by a portion of said rupture disc when the latter is severed by said knife means.

9. Monitoring apparatus as claimed in claim 8, said reflective means having a line of weakness therein along which the reflective means may fold when shiftably engaged by said portion of the rupture disc.

10. For use in a system defining a passage communicating with regions at different pressures, the combination of:

a pressure actuatable shiftable member adapted to be positioned in said passage in fluid-flow-blocking relationship between said regions, said member being constructed and arranged to undergo rupture and allow free flow of fluid through said passage from one region to another when the pressure differential between the regions reaches a preestablished level; and monitoring apparatus for sensing the operational status of said member including:

means for transmitting a light beam along a predetermined path of travel in proximal relationship to said member when the latter is in said normal, fluid-flow-blocking position, means for detecting said light beam while the latter is transmitted along said predetermined path of travel, said predetermined path of travel being oriented such that when the fluid pressure differential between said regions reaches said preestablished level causing shifting of the member to an extent to effect rupture thereof, the beam of light is deflected from said predetermined path by shifting of the member, and means operably associated with said detecting means for indicating when said light beam has been deflected from said predetermined path of travel by shifting of the member as a result of rupture of the latter.

11. The combination of claim 10 wherein said transmitting means and the detecting means are located in directly opposed, facing relationship.

12. The combination of claim 10 wherein is provided a shiftable membrane adapted to be positioned in fluid flow blocking relationship to the passage adjacent the shiftable member and located in a location such that said light beam extending along said predetermined path of travel thereof is between the member and said membrane and means operably associated with said membrane for changing the path of travel of such light beam between the transmitting means and the detecting means in response to shifting of the membrane when the latter is shifted by virtue of an increase in pressure between the membrane and said member attributable to a leak of fluid past the member from the region adjacent thereto toward the opposite region.

13. The combination of claim 12 wherein is provided a reflective element attached to the membrane and movable therewith, said reflective element being located to direct said light beam along said predetermined path when the membrane is in the normal position of the same but operable to allow deflection of said light beam away from the predetermined path of travel of the same when the membrane is shifted to a predetermined extent by said increase in pressure between the member and the membrane.

* * * * *